United States Patent [19]

McIntosh

[11] 4,024,498

[45] May 17, 1977

[54] APPARATUS FOR DEAD TRACK RECOVERY

[76] Inventor: Billy L. McIntosh, 1710 Huge Oaks, Houston, Tex. 77055

[22] Filed: Aug. 4, 1975

[21] Appl. No.: 601,456

[52] U.S. Cl. .......................... 340/146.1 F; 360/26
[51] Int. Cl.² .................................. G06K 5/04
[58] Field of Search ................ 340/146.1 F, 172.5; 360/26, 38, 53

[56] References Cited

UNITED STATES PATENTS

| | | | |
|---|---|---|---|
| 3,142,829 | 7/1964 | Constock | 340/146.1 F |
| 3,430,197 | 2/1969 | Brown | 340/146.1 F |
| 3,509,531 | 4/1970 | Wikinson et al. | 340/146.1 F |
| 3,685,015 | 8/1972 | Bocek | 340/146.1 F |
| 3,728,679 | 4/1973 | McIntosh | 340/146.1 F |
| 3,729,708 | 4/1973 | Wolfer et al. | 340/146.1 F |
| 3,744,023 | 7/1973 | Carpentier et al. | 340/146.1 F |
| 3,800,280 | 3/1974 | Heffner | 340/146.1 F |

Primary Examiner—Charles E. Atkinson
Attorney, Agent, or Firm—Bard, Springs, Jackson & Groves

[57] ABSTRACT

In one exemplary embodiment, an improved apparatus for recovery of a dead track in NRZI tape data format having parallel transmission of data bits is provided in which a dead track recoverer circuit is provided for sensing the absence of a necessary data bit to replace the dead track data bit, and provides means for inserting the data bit in proper time sequence with the data character to reconstitute the data character and thus recover the data information, even though one channel may be dead or inoperative. In combination with the dead track recovery circuit is an improved clock track generator which electronically simulates a clock track to generate strobe signals by utilizing the bit scatter average of the bit characters, averaging them over several characters and generating a variable periodic clock that generates strobe signals having a delay of one-half cell time between data characters. The clock track generator has means for increasing or decreasing the frequency of the periodic clock that generates the strobe signals, and thus can vary the strobe delay time depending on the change in cell time between several data characters. A dynamic skew indicator is also provided which indicates dynamically the degree of skew delay of each slave channel as compared to a master channel in the skew compensation circuit.

22 Claims, 10 Drawing Figures

APPARATUS FOR DEAD TRACK RECOVERY

BACKGROUND OF THE INVENTION

This invention relates to dead track recovery and improved strobe generation in recovering data from data processing equipment having parallel data channels.

Often the data bits of a particular data character are missing on a channel or track because of recording head failure or other causes. The data cannot be recovered satisfactorily when such data bits are missing. The present invention provides means for detecting such a dead track and for generating a simulated data bit that can be inserted when a data bit is missing from a data character. The most common technique of strobe generation is to generate a strobe delay signal that is fixed to approximately one-half cell time between input data bits. A disadvantage of utilizing such a fixed delay time is that there can never be more than a half-cycle (½ cell time) of skew between any two channels. The present invention provides improved strobe generation by generating a simulated clock track and deriving the strobe signals from the clock track. The clock track generates a group of periodic signals and strobe signals whose occurrence is functionally related to the period of the group of periodic signals. Means are provided for detecting the cell time between incoming data characters and changing the time period of the group of output signals generated, hence changing the delay of the generated strobe signals. The clock track generator averages the data bit scatter of the data characters over a predetermined number of characters and changes the clock frequency in order to change the period of the strobe signal delay. The clock track generator utilizes the average bit scatter and attempts to generate the strobe signal at one-half cell time of the average cell time of the data characters.

Accordingly, one primary feature of the present invention is to provide means for recovering a dead track in parallel data transmission.

Another feature of the present invention is to provide a dead track recovery means that can detect the absence of a necessary bit in one of said parallel data bit channels, generate a simulated data bit in response thereto, and selectively apply the simulated data bit to the parallel data bit channel missing the necessary data bit.

Yet another feature of the present invention is to provide means for simulating a clock track and generating strobe signals in combination with the dead track recovery circuit that provides means for controlling the periodic interval of the strobe signals.

SUMMARY OF THE INVENTION

The present invention remedies the problems of the prior art by providing first storage means for receiving the data bits from each of the data transmission channels and storing received data bits until the receipt of a strobe signal for clearing the storage means and a second storage means responsive to a second strobe signal occurring simultaneously with the first strobe signal for receiving the data bits from the output of the first storage means and being responsive to a third strobe signal for clearing the received data bits from the second storage means. In addition, the dead track recovery circuit includes means for detecting the absence of a necessary bit in one of the parallel data bit channels at the output of the first storage means and generating a simulated data bit in response to the detection of the absence of such a necessary bit, the generated data bit being applied as an input to the second storage means. A switching means receives the simulated data bit at the output of the second storage means and selectively applies the simulated data bit to the parallel data bit channel that is missing the necessary data bit. In addition, the apparatus includes a clock track simulator that comprises detecting means for detecting the occurrence of each of the data bits and generating an output pulse in response to the occurrence of such data bits, means responsive to the detecting means' output pulses for generating a plurality of first output signals in response to the receipt of the first data bit of a new data character of the channels, means responsive to the plurality of first output signals for generating a plurality of second output signals defining a periodic interval following the detection of the first data bit. It further includes means that are responsive to the plurality of second output signals for generating a plurality of periodic strobe signals, the periodic occurrence of which is functionally related to the periodic interval of the plurality of second output signals, and control means responsive to the detecting means' output pulses and selected ones of the plurality of first and second output signals for controlling the periodic interval of the plurality of second output signals.

In addition, a dynamic visual indicator is included that visually indicates the static skew delay between each of the slave channels of the skew compensator circuit and the master channel.

Of course, it should be recognized that the system disclosed herein, while described in an environment of magnetic tape reading systems, is clearly applicable to any system in which data bits are transmitted in parallel channels and where the problem of losing or failing to record data bits is encountered. Thus, wide applicability exists for the apparatus disclosed herein for dead track recovery, parity channel error correction, and improved storage generation.

BRIEF DESCRIPTION OF THE DRAWINGS

In order that the manner in which the above-recited advantages and features of the invention are attained can be understood in detail, a more particular description of the invention may be had by reference to specific embodiments thereof which are illustrated in the appended drawings, which drawings form a part of this specification. It is to be noted, however, that the appended drawings illustrate only typical embodiments of the invention and therefore are not to be considered limiting of its scope, for the invention may admit to further equally effective embodiments.

In the drawings.

DETAILED DESCRIPTION OF THE PREFERRED EMBODIMENTS

Figure 1:
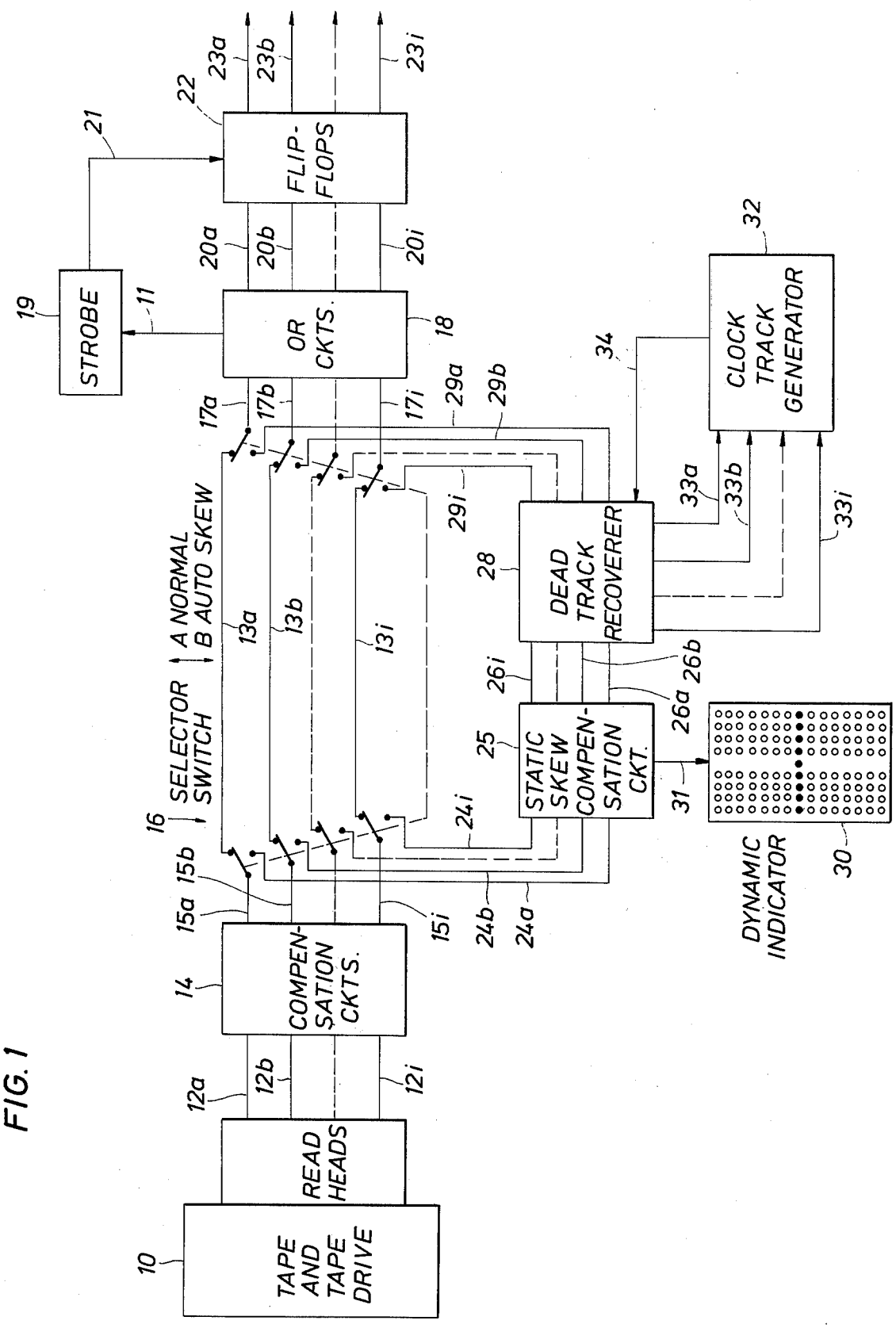
FIG. 1 is a schematic block diagram of a parallel data transmission system from a tape reader showing the utilization of the dead track recoverer invention in connection with a static skew compensation circuit.

FIG. 1 is a schematic block diagram of a high density magnetic tape system of the type used to store and transfer digital data in a high capacity electronic data processing system. A tape and tape drive apparatus 10 includes the tape, tape drive and read heads in a nine-track NRZI (none return to zero) system. Digital output signals from the nine read heads are conducted through a group of paths $12a-i$ to the compensation circuits 14. The compensation circuits 14 provide manual adjustments which permit individual compensation of the read heads of the tape and drive unit 10 for head skew.

With the selector switch 16 in position A (NORMAL) the output signals from the compensation circuits 14 are transferred to OR circuits 18 through paths $15a-i$, $13a-i$ and $17a-i$. The signals, called "data bits," from the read heads and passing through the compensation circuit 14 pass through OR circuits 18 and are applied via paths $20a-i$ to flip-flop or bistable circuits 22, where they are held in temporary storage by the flip-flop circuits. The data bits are held in temporary storage in the flip-flop circuits 22 until a predetermined time has elapsed so that the data signals from all nine tracks should have been received, at which time the OR circuits signal a strobe generator 19 via conductor 11, and strobe signals are applied through line 21 to the flip-flop circuits 22 to clear the data bit signals from the bistable storage circuits 22 in order to receive the data bit information from the next data bit character. The data bits are then transferred through paths $23a-i$ to the remainder of the tape reading apparatus.

With selector switch 16 positioned in the B position (AUTOMATIC SKEW), the data bits from the tape, tape drive and head heads 10 and compensation circuit 14 are applied through paths $15a-i$ and $24a-i$ to a static skew compensation circuit 25 for correcting the time relationship of parallel data bits to correct for static skew. The static skew compensation device 25 may conveniently be the static skew device disclosed in U.S. Pat. No. 3,728,679, issued Apr. 17, 1973 to Billy L. McIntosh. The outputs of the static skew compensation circuit 25 are applied through paths $26a-i$ as an input to a dead track recoverer circuit 28, that is the subject of the present invention. In addition, the same skew-corrected information is applied through paths $33a-i$ as inputs to a clock track generator circuit 32, utilized in combination with the dead track recoverer circuit. The clock track generator generates strobe signals for operating the dead track recoverer circuit 28 which are applied via paths 34. The output of the dead track recoverer circuit is applied through paths $29a-i$ and $17a-i$ through OR circuits 18 to the storage flip-flops 22, as hereinabove described. In addition, the static skew compensation circuit 25 provides signals through path 31 to a dynamic skew indicator 30 which visually portrays the skew delay relationship between each of the slave channels and the master channel of static skew compensation circuit 25.

The selector switch 16, which is shown schematically as a multi-section double-throw switch, will be replaced in practical hardware by a computer control switch and a group of logical AND and OR gates, as would be conventional practice.

Figure 2:
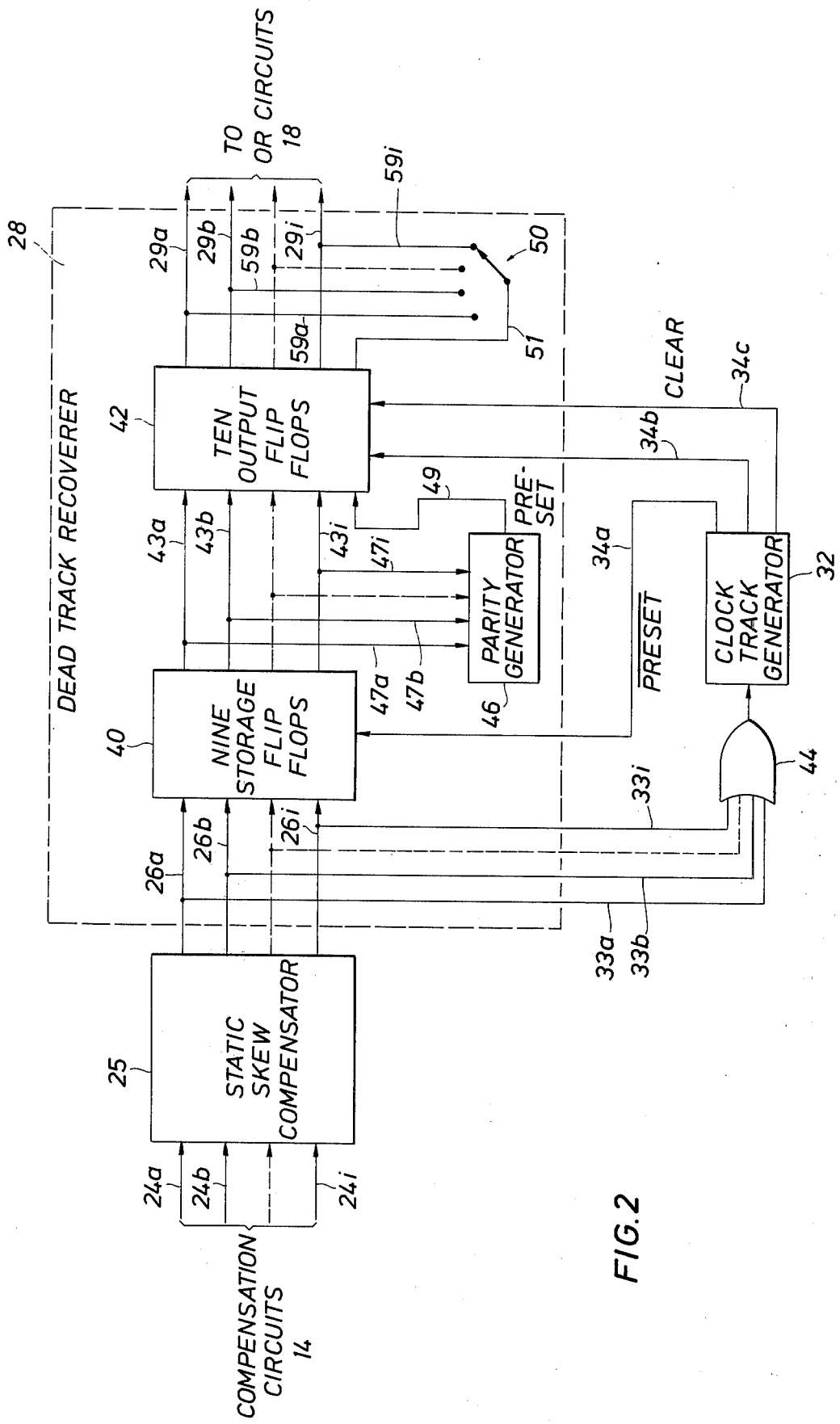
FIG. 2 is a schematic block diagram of the dead track recoverer and clock track generator circuits in accordance with the present invention.

FIG. 2 is a schematic block diagram illustrating the dead track recoverer circuit 28 and the clock track generator circuit 32 according to the present invention. Data bit inputs on paths $24a-i$ from the compensation circuit 14 are applied as inputs to the static skew compensator 25. The static skew-compensated data bit signals from compensator 25 are applied through paths $26a-i$ as inputs to a storage flip-flop circuit 40 of dead track recoverer 28. The static skew-compensated outputs of compensator 25 are also applied through paths $33a-i$ as inputs to an OR gate 44, the output of which is applied to the clock track generator circuit 32, and which will be hereinafter described in greater detail.

The clock track generator 32 generates three strobe signals, a $\overline{PRESET}$ signal applied via path $34a$ as an input to the storage flip-flop circuit 40. A second strobe signal, PRESET, occurring simultaneously with said $\overline{PRESET}$ signal, is applied via path $34b$ as an input to the output flip-flop circuit 42. In addition, a third strobe signal, CLEAR, is applied through path $34c$ as a second input to the output flip-flop circuit 42. The outputs of the storage flip-flops 40 are applied through paths $43a-i$ as inputs to the output flip-flop circuit 42. The outputs of the output flip-flop circuit 42 are applied via paths $29a-i$ as inputs to OR circuits 18. In addition, the data bit outputs of path $43a-i$ from storage flip-flops 40 are applied to a parity generator circuit 46 which detects the absence of a necessary data bit of one of the data bit channels that make up a data character, and generates a simulated data bit signal applied through path 49 as another input to the output flip-flop circuit 42. The simulated data bit signal from parity generator 46, stored in the output flip-flop circuit 42. is applied through path 51 to a switch 50 which can selectively apply the simulated data bit to one of the parallel data bit channels applied as outputs from flip-flop circuit 42 through paths $59a-i$ to one of the data bit channel outputs $29a-i$ for replacing the missing data bit in the appropriate data bit track.

Storage flip-flop circuit 40 acts as a frist storage means for receiving data bits from each of the parallel data bit channels and storing the received data bits. Each of the storage flip-flops for each of the parallel data bit channels is turned on by the receipt of a data bit on its respective channel. The trailing edge of the $\overline{PRESET}$ strobe signal applied via path $34a$ from clock track generator 32 to the storage flip-flop circuit 40 clears the flip-flops of circuit 40, and the flip-flops prepare to receive the next data bit information from lines $26a-i$. The flip-flops of circuit 42 have been set to receive the data bits present on paths $43a-i$ from storage flip-flop circuit 40 in response to the leading edge of a PRESET signal along path $34b$ from clock track generator 32. As hereinabove described, the PRESET signal occurs simultaneously with the application of the $\overline{PRESET}$ signal to storage flip-flop circuit 40. The data bit levels in the output flip-flops of circuit 42 are applied out through paths 29a–i to OR circuits 18 until the trailing edge of a CLEAR strobe signal, applied via path 34c from clock track generator 32, is received by the output flip-flop circuit 42. The trailing edge of the CLEAR strobe signal clears the data bits stored in the flip-flops of circuit 42. The flip-flop circuit 42 must now await another PRESET signal to set the flip-flop and receive data bit signals from flip-flop circuit 40.

The storage flip-flop circuit 40 contains a storage flip-flop for each of the nine parallel data bit channels. The output flip-flop circuit 42 contains nine storage output flip-flops for each of the data bit channels, and a tenth flip-flop to receive the simulated data bit signal from parity generator 46. Parity generator 46 compares the parity of the data bits that make up a data character from one or more of the parallel data bit channels, and if the parity is even, indicating that one of the data bits is missing, the parity generator generates a parity signal applied to the tenth flip-flop of output flip-flop circuit 42. The tenth flip-flop of output flip-flop circuit 42 is strobed by the PRESET and CLEAR signals from the clock track generator as above described and applies the simulated data bit through switch 50 to the selected channel that is missing a data bit to make up a data bit character. In this way, a data bit channel that is "dead" or missing a required data bit for making up a data character, can have a simulated data bit inserted to replace the missing data bit on the dead channel, thereby recovering the dead track and allowing recovery of the data character. In another application, parity generator 46 can detect errors in a separate parity track or channel, such as channel or path 26i in FIG. 2. Parity generator 46 would then generate a correct parity bit and insert it through switch 50 and path 59i to the parity channel to correct parity errors.

Figure 3:
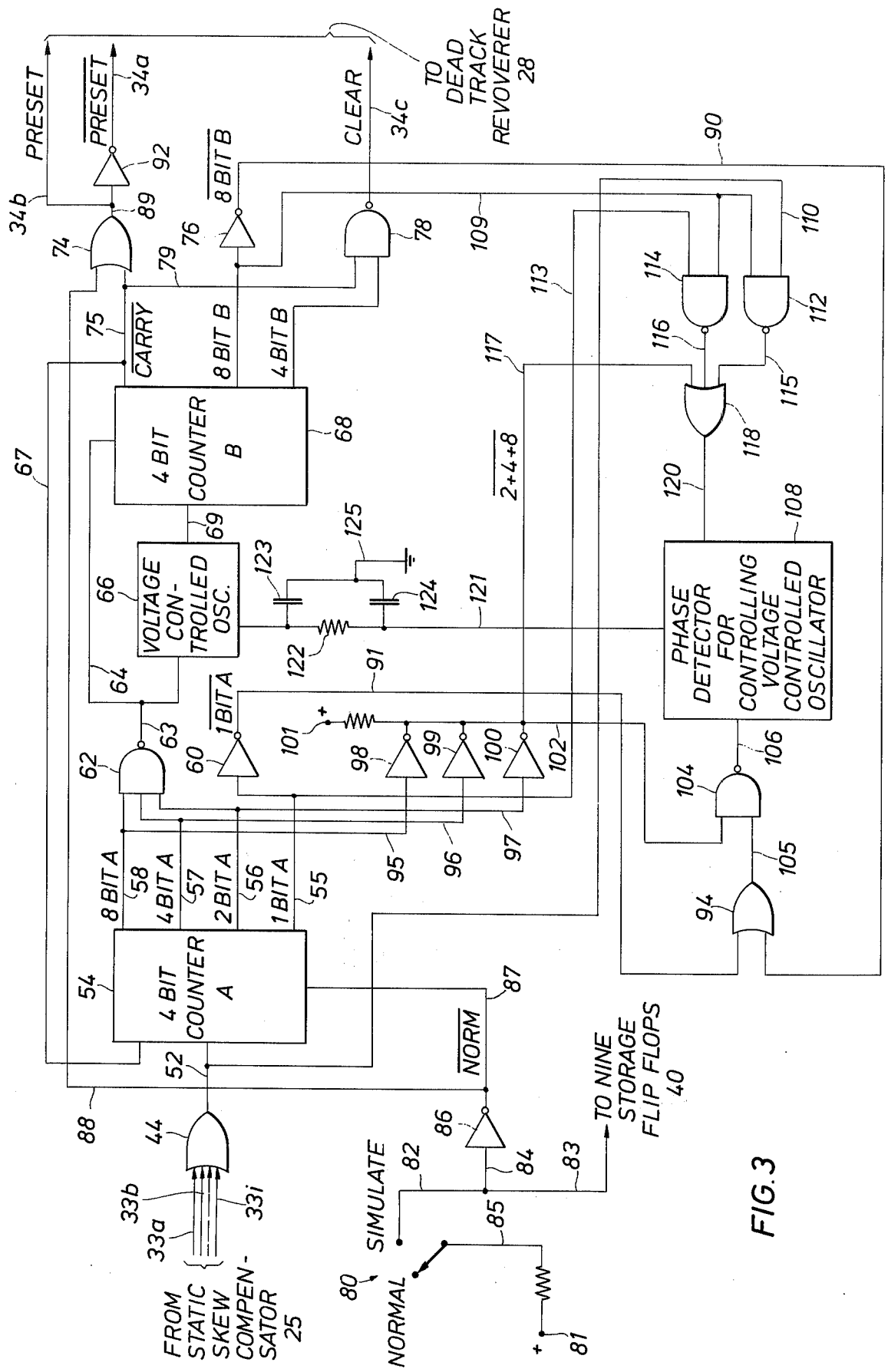
FIG. 3 is a schematic diagram of the clock track generator in accordance with the present invention.

In FIG. 3, a simplified schematic of the clock track generator is shown. The parallel data bit channels from the static skew compensator 25 are applied through paths 33a–i as inputs to an OR circuit 44. As each data bit on a parallel data channel is received by OR circuit 44, an OR signal or pulse is gnerated and applied via line 52 as an input to a four-bit A counter 54. Four-bit A counter 54 is enabled when NORMAL-SIMULATE switch 80 is moved to the SIMULATE position to apply a positive or logic high signal via terminal 81 and conductor 85, switch 80 and conductors 82 and 84 as the input to an inverter 86, the output of which is a $\overline{\text{NORM}}$ signal applied via path 87 to the four-bit A counter 54. The SIMULATE signal is also applied through conductor 83 to the storage flip-flop circuit 40, as will be hereinafter further described. When the NORMAL-SIMULATE switch 80 is in its NORMAL position, the signal level applied through conductor 87 from inverter 86 presets counter 54 to octal 17, thereby disabling the clock generator circuit, as will be hereinafter further described.

Upon receipt of an OR pulse, the four-bit A counter 54 is cleared, and the 1 bit, 2 bit, 4 bit and 8 bit outputs of counter 54 all go to a logic low. The low output of the 1 bit A output of counter 54 is applied through line 55 as an input to an inverter 60, the output of which is a $\overline{\text{1 Bit A}}$ signal, which is applied through line 91 as an input to a NOR gate 94. The 1 bit A output of counter 54 is also applied through lines 55 and 113 as one input to a NAND gate 114. The 2 bit, 4 bit and 8 bit outputs of counter 54 are applied through lines 56, 57 and 58, respectively, as inputs to a NAND gate 62. The output of NAND gate 62 is a logic high signal when the 2 bit, 4 bit and 8 bit inputs are low, and is applied through lines 63 and 65 as an input to a voltage controlled oscillator 66, turning on the oscillator. The output of NAND gate 62 is also applied through lines 63 and 64 as an input to a 4-bit B counter 68.

Oscillator signals from voltage controlled oscillator 66 are applied through lines 69 as an input to the four-bit B counter which counts the discrete oscillator pulses. Only the 4 bit and 8 bit outputs of four-bit B counter 68 are utilized, the 4 bit output being applied through line 70 as one input to a NAND gate 78. The 8 bit B output from counter 68 is applied through line 71 to an inverter 76 whose output is a $\overline{\text{8 Bit B}}$ signal applied through line 90 as a second input to NOR gate 94. The 8 bit B signal applied through line 71 is also applied through line 109 as inputs to NAND gates 112 and 114. When four-bit B counter 68 reaches octal 16, a $\overline{\text{CARRY}}$ signal is applied from counter 68 through line 72 as one input to a NOR gate 74. The $\overline{\text{CARRY}}$ signal is also applied through line 67 as an input to four-bit A counter 54. Each CARRY pulse output from four-bit B counter 68 counts up four-bit A counter 54. With a $\overline{\text{NORM}}$ signal applied from the output of inverter 86 through line 88 to enable gate 74, the $\overline{\text{CARRY}}$ pulse is applied through gate 74 and becomes the PRESET strobe pulse applied through lines 89 and 34b to the dead track recoverer circuit 28 as hereinabove described in FIG. 2. The PRESET pulse is applied to inverter 92 whose output is the $\overline{\text{PRESET}}$ strobe signal, occurring simultaneously in time with the preset signal and of opposite polarity and is applied through line 34a to the dead track recoverer circuit 28, as hereinbefore described.

The $\overline{\text{CARRY}}$ signal output from four-bit B counter 68 is also applied through line 79 to the enabled gate 78 to mark the beginning of the CLEAR strobe signal applied through line 34c to the dead track recoverer 28, as hereinabove described. As soon as the $\overline{\text{CARRY}}$ signal is generated by four-bit B counter 68, the counter begins to count again, and as soon as it reaches a count of octal four, a high output is generated at the 4 bit B output which is applied to gate 78, which terminates the CLEAR strobe signal applied through line 34c.

The 2 bit A, 4 bit A and 8 bit A outputs from four-bit A counter 54 are also applied through lines 95, 96 and 97 to inverters 98, 99 and 100, whose output is a $\overline{2+4+8}$ output signal applied through line 117 as one input to NOR gate 118. The gated outputs of gates 112 and 114 are applied through lines 115 and 116, respectively, as second and third inputs to NOR gate 118. The output of NOR gate 118 is applied through line 120 to a phase detector circuit 108 for controlling the voltage controlled oscillator 66. The output of NOR gate 94 is applied through line 105 as one input to a NAND gate 104, whose second input is also a $\overline{2+4+8}$ signal applied through line 102. The output of gate 104 is applied through line 106 as a second input to phase detector circuit 108. The output of phase detector circuit 108 is applied through line 121 to a resistor-capacitor circuit comprising resistor 122 and parallel tied capacitors 123 and 124, commonly tied to ground through conductor 125, as a control input to the voltage controlled oscillator 66.

When the $\overline{2+4+8}$ output signal through line 102 is high, gate 104 is enabled, and the $\overline{\text{1 Bit A}}$ or $\overline{\text{8 Bit B}}$ signals are applied through enabled gate 104 as an input to the phase detector circuit 108, and if the $\overline{1\text{ Bit}}$ $\overline{A}$ leads the $\overline{8\text{ Bit }B}$ signal when a new OR signal is received, the gated input through line 106 causes the phase detector to generate a control signal applied through line 121 and the resistor capacitor-circuit to increase the voltage to the voltage controlled oscillator 66, thereby tending to increase the frequency of oscillator 66. On the other hand, an 8 bit B signal present as an output from the four-bit B counter 68 enables gates 112 and 114, and the receipt of an OR signal through line 110 to gate 112, or a 1 bit A signal through line 113 to gate 114, will be passed by gate 112 or 114 through gate 118 and line 120 as an input to gate 108. If the 8 bit B output signal leads the 1 bit A output signal when a new OR signal is received when applied to gate 114, or upon the occurrence of an OR signal applied through gate 112, the signals applied through gate 118 to phase detector 108 cause the phase detector to decrease its voltage output applied through line 121 and the resistor-capacitor circuit as an input to voltage controlled oscillator 66, tending to decrease the oscillator frequency.

However, the resistor-capacitor network in line 121 is slow to respond and averages several phase detector output signals or control pulses applied through line 121 before a significant control voltage is actually applied to the voltage controlled oscillator 66 to appreciably change its frequency. In this manner, the voltage controlled oscillator does not swing with each control signal generated by the phase detector, but only changes when a trend to either increase or decrease is detected and averaged over a predetermined number of control signals generated.

Figure 4:
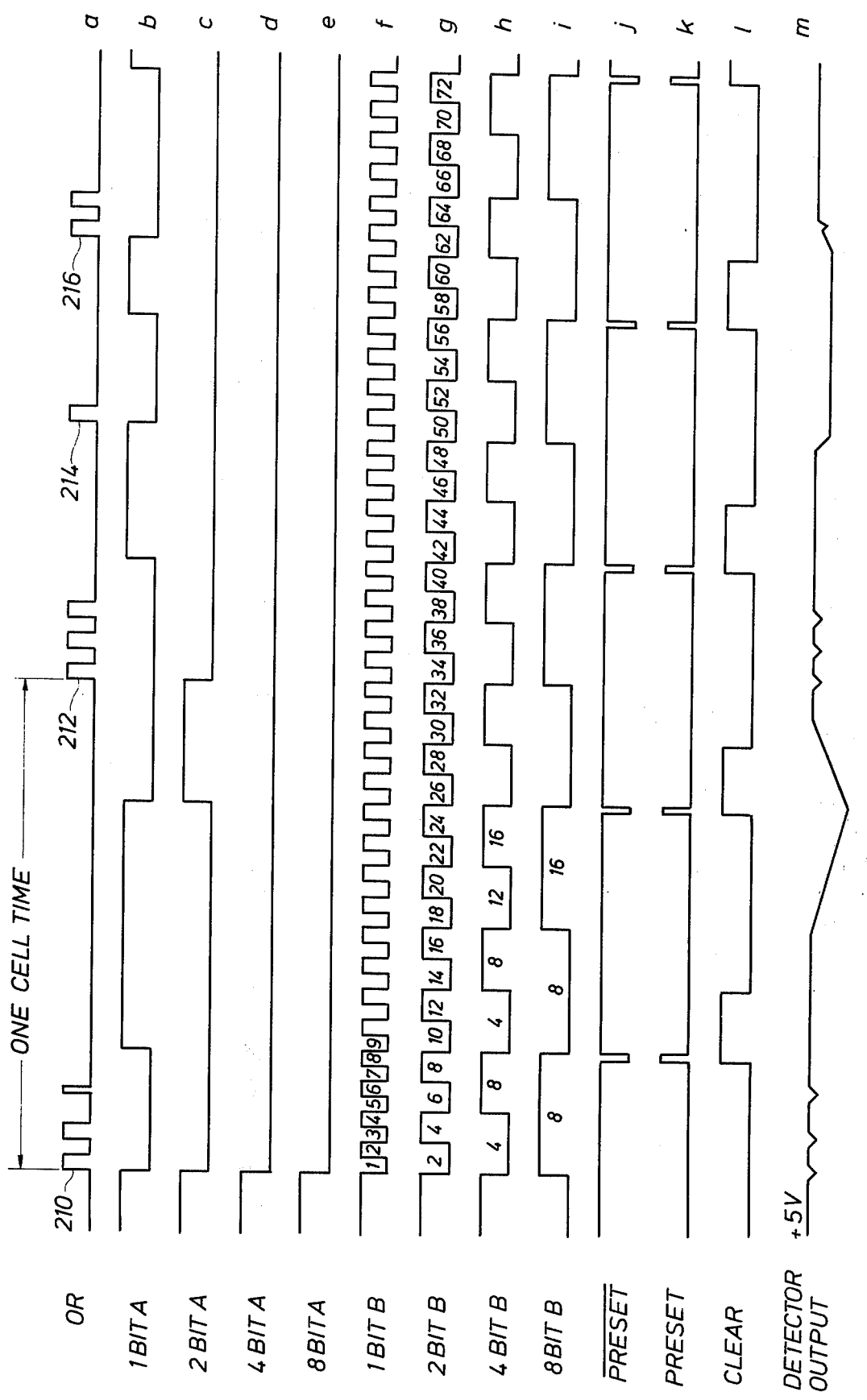
FIG. 4 is a timing diagram showing the relationship of signals in the clock track generator and its output strobe signals.
Figure 5:
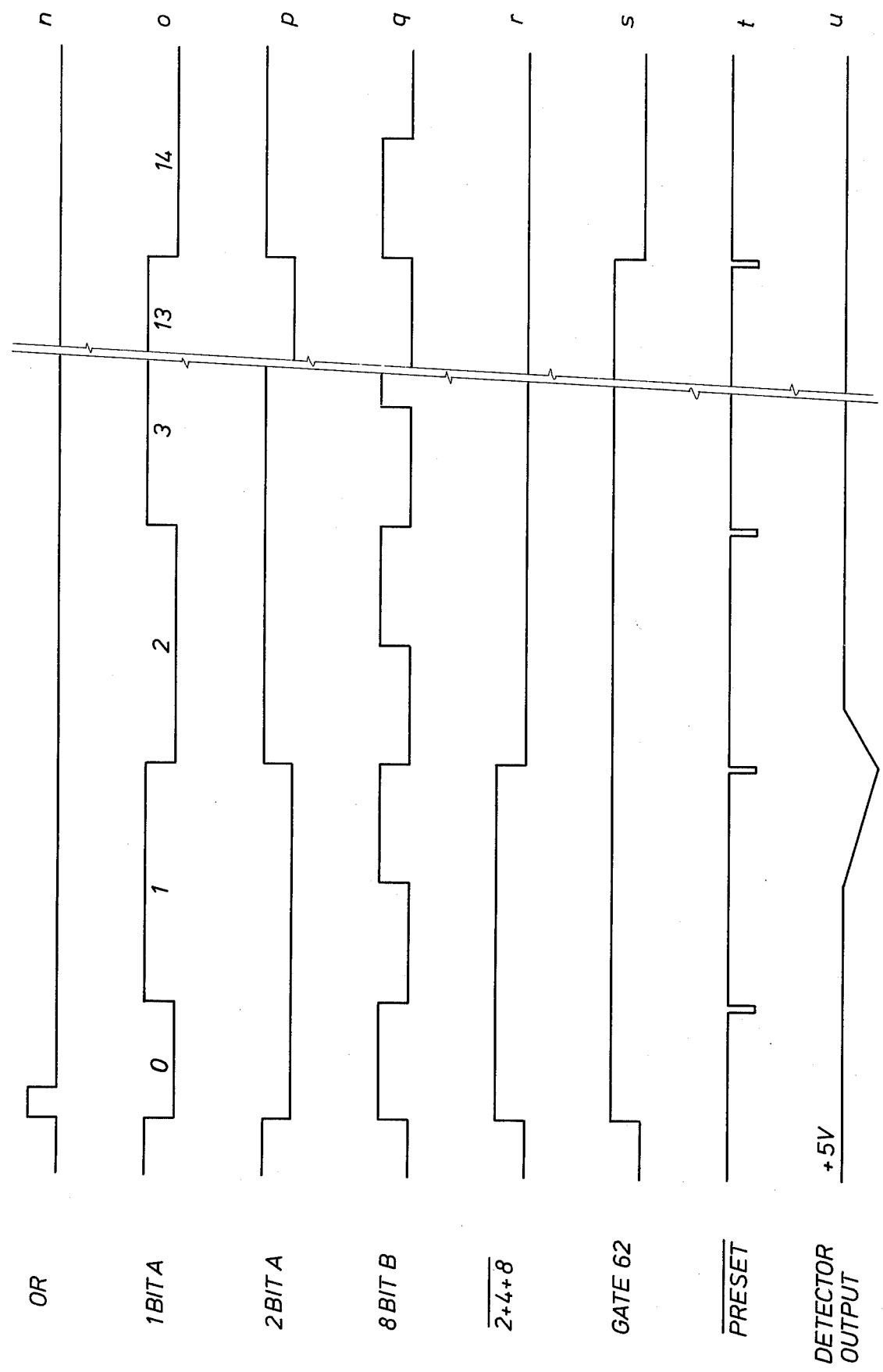
FIG. 5 is a timing diagram showing the relationship of signals in the clock track generator.

The operation of the clock track generator circuit of FIG. 3 can be more readily seen by reference to FIGS. 4 and 5. FIGS. 4 and 5 are timing diagrams showing the relationship of various output control and strobe signals generated by the clock track generator 32, as shown on lines *a–m*, and *n–u*, respectively. With four-bit A counter 54 enabled, the occurrence of an OR pulse input through line 52 from OR gate 44, shown at 210 on line a of the timing diagram of FIG. 4, clears counter 54 and sets the 1 bit A, 2 bit A, 4 bit A and 8 bit A outputs to a low logic level, as shown in lines *b*, *c*, *d* and *e*, respectively, of the timing diagram. Simultaneously, the voltage controlled oscillator 66 is gated on, and the oscillator frequency is applied through line 69 to four-bit B counter 68, which begins to count the oscillator pulses. The 1 bit B and 2 bit B outputs of four-bit B counter 68 are not utilized but are shown as they would appear on lines *f* and *g* of the timing diagram of FIG. 4. The 4 bit B and 8 bit B outputs of the four-bit B counter 68 are shown on lines *h* and *i* of the timing diagram, and, assuming that the four-bit B counter 68 was at an octal eight count upon the occurrence of the first OR pulse 210, four-bit B counter 68 counts an additional eight counts and generates a $\overline{\text{CARRY}}$ signal (not shown) which is gated through gate 74 as a PRESET strobe signal shown on line *k* of the timing diagram, and a $\overline{\text{PRESET}}$ strobe signal shown on line *j* of the timing diagram. Upon the occurrence of the trailing edge of the PRESET and $\overline{\text{PRESET}}$ strobe signals, which coincide with the trailing edge of the $\overline{\text{CARRY}}$ signal (not illustrated), the four-bit A counter 54 is counted to one, and 1 bit A, as shown on line *b* of the timing diagram, goes to a logic high state, while the 4 bit B and 8 bit B outputs of four-bit B counter 68 go to a low state.

The CLEAR signal, shown on line 1 of the timing diagram of FIG. 4, has its leading edge coinciding with the leading edge of the PRESET and $\overline{\text{PRESET}}$ signals, and continues at a logic high state for the duration of time it takes the four-bit B counter 68 to count to octal four, at which time the 4 bit B output is applied through gate 78 as the trailing edge of the CLEAR strobe signal. Four-bit B counter 68 continues to count until it reaches another octal count of 16, whereupon a second PRESET, $\overline{\text{PRESET}}$ and CLEAR strobe signals are generated, and four-bit A counter 54 is counted to two, with the 1 bit A output returning to a logic low state, and the 2 bit A output going to a high logic condition, as shown on line *c* of the timing diagram. In the absence of a new OR signal occurring after the first PRESET signal, assuming a data bit was dropped, counter 68 would continue to count to octal 16, and count up counter 54 until counter 54 reaches octal 14. When counter 54 reaches octal 14, the output of gate 62 is low, gating off oscillator 66 and presetting counter 68 to octal 7. For each received OR pulse applied through gate 112, the detector circuit 108 would generate an output control signal of short duration, tending to make the oscillator decrease its frequency, as shown by the series of dips in the output voltage of the detector. When counter 68 reaches an eight count the second time, 8 bit B goes high and, since 8 bit B and 1 bit A are both high, gate 114 passes a signal to detector 108 through gate 118 which causes the detector to generate a control signal output lower than 5 volts, which would make the oscillator 66 decrease its frequency. However, as hereinbefore described, the RC network would smooth out such changes in the control signal from detector 108 and average such signals over several changes. When 2 bit A goes high, 1 bit A goes low, and the $\overline{2 + 4 + 8}$ signal applied through gate 118 is detected by detector 108 which generates a control signal applied through line 121 instructing the oscillator to increase its frequency. The existence of a $\overline{2 + 4 + 8}$ signal will always cause the detector to increase its output to 5 volts to force oscillator 66 to return to its average frequency. The above action is shown on line *m* of the FIG. 4 diagram in exaggerated scale. If the oscillator 66 decreases its frequency, counter 68 will count slower, thus increasing the periodic interval of the 4 bit B and 8 bit B outputs of the four-bit B counter 68, attempting to make the PRESET, $\overline{\text{PRESET}}$ and CLEAR strobe signals occur at one-half cell time. However, as hereinabove described, the resistor-capacitor network in line 121 delays any control signal from phase detector 108 for averaging several control signals [in practice, averaging seven control signals was found to be most efficient]. The average of several control signals will then be applied to the oscillator 66 to smoothly change its frequency in one direction or the other.

When a second series of data bits is received, shown as a second group of OR pulses beginning with pulse 212 on line a of the FIG. 4 timing diagram, the first OR pulse 212 clears four-bit A counter 54, and the 1 bit A, 2 bit A, 4 bit A and 8 bit A outputs all return to a logic low state, as shown in timing diagram lines *b*, *c*, *d* and *e*. The four-bit B counter 68 continues to count until another PRESET, $\overline{\text{PRESET}}$ and CLEAR strobe signals are generated, as shown by lines *j*, *k* and *l* of the timing diagram. As may be seen from FIG. 4, upon the occurrence of OR signal 212, the 8 bit B signal is going high and the 1 bit A signal is going low, and when applied to gate 114, will have no effect on the phase detector 108 or oscillator 66.

The next group of data bits of a data character will be received by the OR circuit, and OR pulse 214 represents the first data bit received in the next group. Notice that the cell time is shorter between pulses 212 and 214 than between 210 and 212, hence the need for averaging the time, rather than having the oscillator 66 instantly respond to all direct control signals to increase or decrease frequency. OR pulse 214 resets four-bit A counter 54, and the 1 bit A, 2 bit A, 4 bit A and 8 bit A outputs go to a logic low level. In this circumstance, the $\overline{1 \text{ bit A}}$ signal will go low when OR pulse 214 occurs, and the $\overline{8 \text{ bit B}}$ signal will be high, and the resultant signals applied through gates 94 and 104 to the phase detector will cause the phase detector 108 to generate a control voltage directing oscillator 66 to decrease the frequency of the oscillator, and thereby increase the periodic interval of the 4 bit B and 8 bit B signal outputs of the four-bit B counter 68. However, as above described, this "decrease" control signal from detector 108 is averaged by the resistor-capacitor network in line 121, and the actual control signal to oscillator 66 will not be of the magnitude illustrated by the voltage increase in the detector output diagram of line m.

In this manner, the phase detector control signals are averaged over the receipt of several data bit characters, represented by the leading OR signals 210, 212, 214 and 216 that will average the bit scatter of the successive bit characters, the average thus becoming almost as periodic as a real clock track on the tape. The phase detector 108 control of the voltage controlled oscillator 66 atttempts to either increase or decrease the periodic interval of the 4 bit B and 8 bit B control signals generated by the four-bit B counter 68, thereby changing the periodic occurrence of the PRESET, $\overline{\text{PRESET}}$ and CLEAR strobe signals, which are functionally related to the periodic interval of the 4 bit B and 8 bit B output signals of counter 68. Ideally, the PRESET, $\overline{\text{PRESET}}$ and CLEAR strobe signals would be generated at one-half cell intervals to accommodate the received data bits. In other words, the clock track generator ideally tries to generate strobe signals, namely PRESET, $\overline{\text{PRESET}}$ and CLEAR, at one-half cell time intervals, averaged over several bit characters, and corresponding to actual variances in cell time.

FIG. 5 illustrates the timing relation of signals in the clock track generator 32 when only a single OR pulse is received or if the OR shown on line n represents the last data bit signal in a group of data signals. When the OR pulse is received by four-bit A counter 54, 1 bit A goes low and 2 bit A goes low, as shown in lines o and p. Assuming the four-bit B counter was set to octal seven when the OR pulse arrived, it would go high as would the $\overline{2+4+8}$ signal as shown in lines q and r. The output of gate 62 goes high, and the oscillator 66 is gated on. A $\overline{\text{PRESET}}$ signal is generated when counter 68 reaches a count of 16 and 1 bit A goes high. If no further OR pulses are received, counter 68 continues to count as may be seen by the 1 bit A and 2 bit A signals shown on lines o and p. When counter B reaches its second count of 8 after the occurrence of the first $\overline{\text{PRESET}}$ strobe signal, both the 1 bit A and 8 bit B signals are high, and the detector will generate a control voltage instructing the oscillator 66 to decrease its frequency to enlarge the periodic interval of 8 bit B. However, when counter 68 reaches a two count, the $\overline{2}$ $\overline{+4+8}$ signal goes low, and the detector generates a control signal that wants to drive the oscillator 66 back to its normal frequency, as shown in timing diagram line u. Once a two count is reached by counter 68, the detector knows that the average cell time has been exceeded and that the absence of another OR pulse is an unusual situation and therefore will try to drive oscillator 66 back to its normal frequency.

When counter 68 reaches an octal count of 14, 1 bit A goes low, 2 bit A goes high, 8 bit B goes high and the output of gate 62 goes low, gating off oscillator 66 and resetting counter 68 to an octal count of 7 to await another OR pulse.

The clock track generator 32 could be described as comprising OR gate 44 that functions as a detecting means for detecting the occurrence of each of the received data bits and generating an output pulse representative of each of the data bits. The four-bit A counter 54 functions as a means responsive to the detecting means' output pulses for generating a plurality of first output signals in response to the receipt of the first parallel data bit of a new data character. Gate 62, voltage controlled oscillator 66 and the four-bit B counter 68 function as a means responsive to the plurality of first output signals for generating a plurality of second output signals defining a variable periodic interval following detection of the first data bit of a new cata character. The gates 74 and 78 and inverter 92 function as means responsive to the plurality of second output signals for generating a plurality of periodic strobe signals, the periodic occurrence of which is functionally related to the periodic interval of the plurality of second output signals. Gates 94, 104, 112, 114 and 118, inverters 60, 98, 99 and 100, phase detector circuit 108 and the resistance-capacitance network can be described as control means responsive to the detecting means' output pulses and selected ones of said plurality of first and second output signals and cooperating with the means for generating a plurality of second output pulses defining a periodic interval following the first data bit for controlling the periodic interval of said plurality of second output signals. The phase detector 108 and the resistance-capacitance network can further functionally be described as means for detecting the time phase relationship between selected ones of said first and second output signals generated in response to the occurrence of said first parallel data bit from one of the channels and generating a control signal in response thereto, and a means for receiving successive ones of said control signals and averaging a predetermined number of the control signals and generating an averaged control signal for controlling the periodic interval of said plurality of second output signals.

Figure 6:
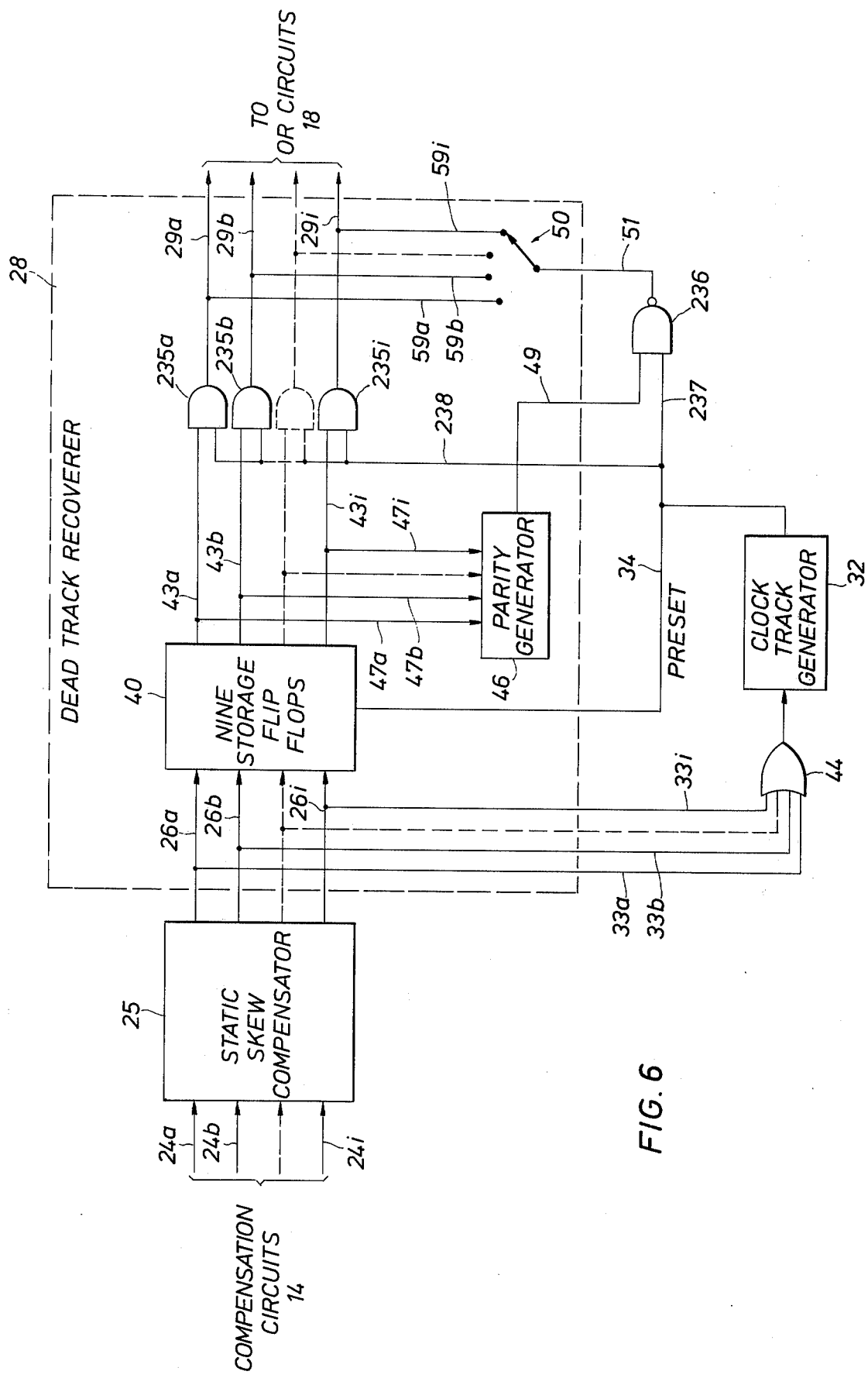
FIG. 6 is a schematic block diagram of the dead track recoverer and clock track generator circuits in accordance with a second embodiment of the invention.

FIG. 6 is a schematic block diagram illustrating the dead track recoverer circuit 28 and the clock track generator circuit 32 according to a second embodiment of the present invention. Data bit inputs on paths 24a–i from the compensation circuit 14 are applied as inputs to the static skew compensator 25. The static skew-compensated data bit signals from compensator 25 are applied through paths 26a–i as inputs to a storage flip-flop circuit 40 of dead track recoverer 28. The static skew-compensated outputs of compensator 25 are also applied through paths 33a–i as inputs to an OR gate 44, the output of which is applied to the clock track generator circuit 32.

The clock track generator 32 generates a strobe signal, PRESET, applied via path 34 as an input to the storage flip-flop circuit 40. The outputs of the storage flip-flops 40 are applied through paths 43a–i as inputs to gates 235a–i. The outputs of the gates 235a–i are applied via paths 29a–i as inputs to OR circuits 18. In addition, the data bit outputs of path 43a–i from storage flip-flops 40 are applied to a parity generator circuit 46 which detects the absence of a necessary data bit of one of the data bit channels that make up a data character, and generates simulated data bit signal applied through path 49 as an input to gate 236. The simulated data bit signal from parity generator 46, gated through gate 236, is applied through path 51 to a switch 50 which can selectively apply the simulated data bit to one of the parallel data bit channels applied as outputs from gates 235a–i through paths 59a–i to one of the data bit channel outputs 29a–i for replacing the missing data bit in the appropriate data bit track. The PRESET strobe signal is also applied through line 238 as second gating inputs to gates 235a–i. The PRESET strobe signal is also applied through path 237 as a gating input to gate 236. When the PRESET strobe signal is generated, it clears flip-flop circuits 40 and gates on gates 235a–i and 236 to allow data bit signals present on paths 43a–i to be gated out through lines 29a–i, and permits a simulated data bit from parity generator 46 to be applied via line 49 through enabled gate 236 to switch 50 and back to the selected dead track. In this embodiment, the second rank of flip-flops is not needed, and the gates 235a–i serve functionally as the flip-flop circuit 42 in the first embodiment. Operation of the clock track generator 32, the parity generator 46 and storage flip-flop circuit 40 is identical to that hereinbefore described for the first embodiment and does not need further elaboration.

Storage flip-flop circuit 40 acts as a storage means for receiving data bits from each of the parallel data bit channels and storing the received data bits. Each of the storage flip-flops for each of the parallel data bit channels is turned on by the receipt of a data bit on its respective channel. The trailing edge of the PRESET strobe signal applied via path 34 from clock track generator 32 to the storage flip-flop circuit 40 clears the flip-flops of circuit 40, and the flip-flops prepare to receive the next data bit information from lines 26a–i. The gates 235a–i have data bit signals present at their inputs along lines 43a–i from flip-flop circuit 40. When the trailing edge of the PRESET strobe signal gates on gates 235a–i, the data bit signals are applied out through lines 29a–i to OR circuits 18. The PRESET strobe signal also gates the simulated data bit signal from parity generator 46 through gate 236, switch 50 and paths 59a–i to a selected channel 29a–i, to recover a "dead" track as hereinabove described.

Figure 7:
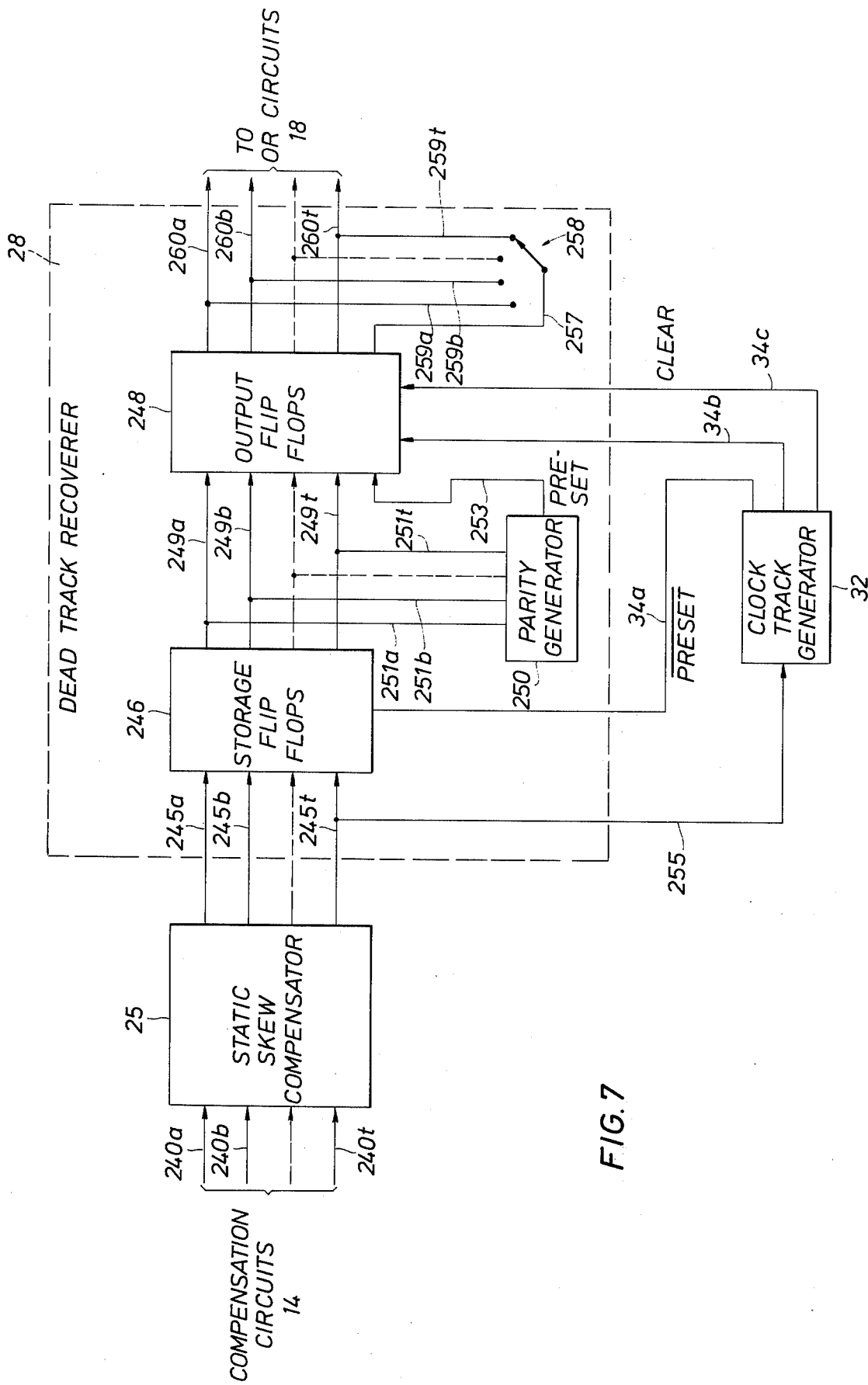
FIG. 7 is a schematic block diagram of the dead track recoverer and clock track generator circuits in accordance with a third embodiment of the invention.

FIG. 7 is a schematic block diagram illustrating the dead track recoverer circuit 28 and the clock track generator circuit 32 according to a third embodiment of the present invention, as could be utilized in a 21-track format having a clock track. Data bit inputs on paths 240a–t from the compensation circuit 14 are applied as inputs to the static skew compensator 25. The static skew-compensated data bit signals from compensator 25 are applied through paths 245a–t as inputs to a storage flip-flop circuit 246 of dead track recoverer 28. The clock track, herein assumed to be track 240t, is applied through paths 255 as an input to the clock track generator circuit 32.

The clock track generator 32 generates three strobe signals, a $\overline{\text{PRESET}}$ signal applied via path 34a as an input to the storage flip-flop circuit 246. A second strobe signal, PRESET, occurring simultaneously with said $\overline{\text{PRESET}}$ signal, is applied via path 34b as an input to the output flip-flop circuit 248. In addition, a third strobe signal, CLEAR, is applied through path 34c as a second input to the output flip-flop circuit 248. The outputs of the storage flip-flops 246 are applied through paths 249a–t as inputs to the output flip-flop circuit 248.

The outputs of the output flip-flop circuit 248 are applied via paths 260a–t as inputs to OR circuits 18. In addition, the data bit outputs of path 249a–t from storage flip-flops 246 are applied to a parity generator circuit 250 which detects the absence of a necessary data bit of one of the data bit channels that make up a data character, and generates a simulated data bit signal applied through path 253 as another input to the output flip-flop circuit 248. The simulated data bit signal from parity generator 250, stored in the output flip-flop circuit 248, is applied through path 257 to a switch 50 which can selectively apply the simulated data bit to one of the parallel data bit channels applied as outputs from flip-flop circuit 248 through paths 259a–t to one of the data bit channel outputs 260a–t for replacing the missing data bit in the appropriate data bit track.

Storage flip-flop circuit 246 acts as a first storage means for receiving data bits from each of the parallel data bit channels and storing the received data bits. Each of the storage flip-flops for each of the parallel data bit channels is turned on by the receipt of a data bit on its respective channel. The trailing edge of the $\overline{\text{PRESET}}$ strobe signal applied via path 34a from clock track generator 32 to the storage flip-flop circuit 246 clears the flip-flops of circuit 246, and the flip-flops prepare to receive the next data bit information from lines 245a–t. The flip-flops of circuit 248 have been set to receive the data bits present on paths 249a–t from storage flip-flop circuit 246 in response to the leading edge of a PRESET signal along path 34b from clock track generator 32. As hereinabove described, the PRESET signal occurs simultaneously with the application of the $\overline{\text{PRESET}}$ signal to storage flip-flop circuit 246. The data bit levels in the output flip-flops of circuit 248 are applied out through paths 260a–t to OR circuit 18 until the trailing edge of a CLEAR strobe signal, applied via path 34c from clock track generator 32, is received by the output flip-flop circuit 248. The trailing edge of the CLEAR strobe signal clears the data bits stored in the flip-flops of circuit 248. The flip-flop circuit 248 must now await another PRESET signal to set the flip-flop and receive data bit signals from flip-flop circuit 246.

The storage flip-flop circuit 246 contains a storage flip-flop for each of the 21 parallel data bit channels. The output flip-flop circuit 248 contains 21 storage output flip-flops for each of the data bit channels, and a 22nd flip-flop to receive the simulated data bit signal from parity generator 250. Parity generator 250 functions in the same manner as parity generator 46 in previous embodiments. The twenty-second flip-flop of output flip-flop circuit 248 is strobed by the PRESET and CLEAR signals from the clock track generator as above described and applies the simulated data bit through switch 50 to the selected channel that is missing a data bit to make up a data bit character.

The clock track generator 32 receives clock track signals through line 255 and generates its output strobe signals in response thereto. However, if the clock track signal is lost from path 245t, the clock track generator 32 will take over the function of acting as a clock track, as hereinbefore described for previous embodiments, to properly delay the timing of the strobe signals.

It may be seen from the previous figures that the clock track generator is capable of generating strobe signals functionally related to the time intervals between selected successive magnetic flux changes on the tape recording, whether the flux changes are successive data characters made up of a group of data bits or are successive clock track signals on the recorded tape.

Figure 8:
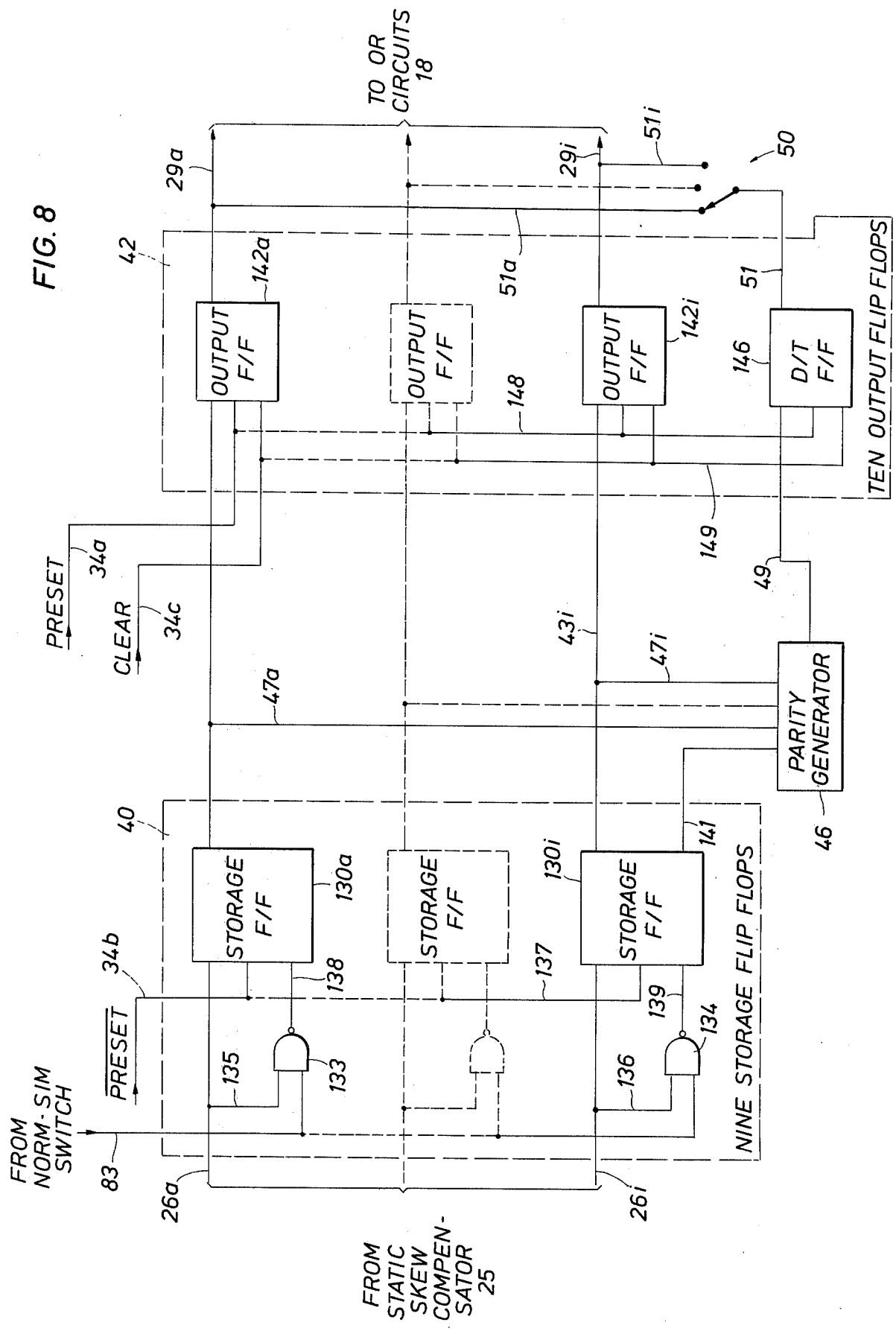
FIG. 8 is a schematic diagram of the dead track recoverer in accordance with the present invention.

Turning now to FIG. 8, a simplified schematic of the dead track generator circuit 28 is shown. Data bit inputs from the nine channels of the NRZI data track format received from the static skew compensator 25 are applied as inputs through paths 26a–i as inputs to storage flip-flops 130a–i, respectively. In addition, an input from the NORMAL-SIMULATE switch 80 is applied through line 83 as one input to gates 133–134, shown as gated inputs to storage flip-flops 130a–i. The data bit inputs of lines 26a–i are also applied as inputs to gates 133 and 134 through lines 135–136. When the NORMAL-SIMULATE switch 80 is in the NORMAL position, the signal applied through line 83 to NAND gates 133–134 is disabled, the clock track generator is also disabled, and the data bit inputs on lines 26a–i are applied through storage flip-flops 130a–i to the output flip-flops 142a–i of the output flip-flop circuit 42. However, when the NORMAL-SIMULATE switch 80 (see FIG. 3) is in the SIMULATE position, the logic level applied through line 83 to gates 133–134 of the storage flip-flop circuit 40 enables the gates and sets storage flip-flops 130a–i to receive each incoming data bit on lines 26a–i for storage. The data bit signal levels will appear as outputs of flip-flops 130a–i until the trailing edge of a PRESET signal is received through line 34b and 137 to clear the storage flip-flops 130a–i. The output flip-flops 142a–i are set by the occurrence of the leading edge of the PRESET signal applied through line 342, which occurs simultaneously upon the occurrence of the $\overline{\text{PRESET}}$ signal being applied to the storage flip-flops 130a–i of the storage flip-flop circuit 40. The data bit information in output flip-flops 142a–i is present at lines 29a–i until the trailing edge of the CLEAR strobe signal is received through lines 34c and 149 to clear the flip-flops 142a–i which are now ready to receive another PRESET strobe signal.

A parity generator 46 receives data bit information from the output of the storage flip-flop circuit 40 through paths 47a–i. In addition, a second output from storage flip-flop 130i is applied through line 141 to the parity generator 46. The parity generator 46 detects the absence of a necessary data bit for forming a complete data character by detecting the parity of the parallel data bit channels making up a data character, and if an even parity is detected, thus indicating the absence of a necessary data bit to form a data character, a simulated data bit is generated by parity generator 46 and applied through line 49 as an input to a dead track flip-flop 146 which is the tenth flip-flop of the flip-flop circuit 42. Dead track flip-flop 146 also receives the PRESET and CLEAR strobe signals via lines 34a and 148, and 34c and 149, respectively, to gate the flip-flop on and off. Upon arrival of the trailing edge of the CLEAR strobe signal, dead track flip-flop 146 clears its stored simulated data bit signal and applies the signal through line 51 as an input to a selector switch 50. Selector switch 50 is shown in position 1 to transfer the simulated data bit from the parity generator 46 and dead track flip-flop 146 to channel 1, where the simulated data bit will be applied out through line 29a. In this way, if the first channel had a dead track, and no data bit information was available to make up a necessary data character, the simulated data bit generated by the parity generator 46 could be applied to channel 1 to form and reconstitute the necessary data character. With the selector switch 50 in its last position, any simulated data bit signals would not be applied to respective lines 29a–i, thus disabling the dead track recoverer. Parity generator 46 may conveniently be any conventional parity detector and generator such as a series 74180 integrated circuit.

The dead track recoverer circuit 28 can be described as comprising flip-flop circuit 40 which is one means for receiving data bits from each data channel and storing the received data bits and being responsive to one of the plurality of strobe signals ($\overline{\text{PRESET}}$) from the clock track generator 32 for clearing the received data bits. The output flip-flop circuit 42 functions as a second means responsive to a second strobe signal (PRESET) occurring simultaneously with the $\overline{\text{PRESET}}$ strobe signal for receiving the data bits from the output of the first storage means, the second storage means responsive to a third strobe signal (CLEAR) for clearing the received data bits from the output flip-flop circuit 42. The parity generator 46 comprises means for detecting the absence of a necessary bit in one of the parallel data bit channels at the output of the first storage means (storage flip-flop circuit 40) and generating a simulated data bit in response thereto, with the generated data bit being applied as an input to the output flip-flop circuit 42. Switch 50 functions as a switching means for receiving the simulated data bit at the output of the second storage means and selectively applying the simulated data bit to the parallel data bit channel missing the necessary data bit.

Figure 9:
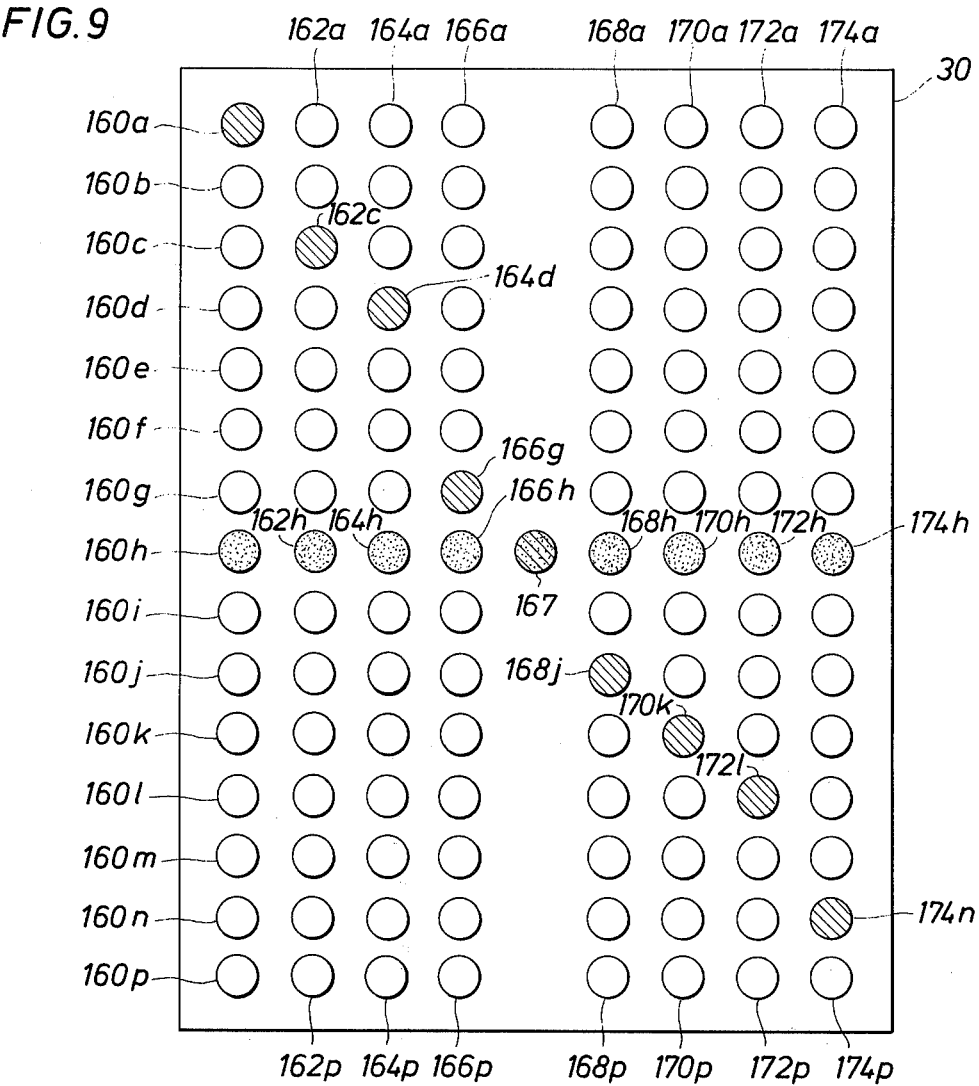
FIG. 9 is a pictorial diagram illustrating the dynamic skew indicator.

Another feature of the present invention is illustrated in FIG. 9. As may be seen in FIG. 1, the static skew-compensation circuit 25 inputs signals through line 31 to a dynamic skew indicator 30. The dynamic skew indicator 30 is shown in greater detail in FIG. 9. The indicator comprises, for an NRZI nine-track format, eight rows of indicators 160, 162, 164, 166, 168, 170, 172 and 174. Each row of indicators 160–174 represents the output from one of the slave channels of the skew compensation circuit 25. Each row 160–174 further comprises a series of fifteen indicator lamps a–p. The center row, represented as 160h–174h, and indicator lamp 167, representing the master channel of the skew compensation circuit 25, would indicate zero relative skew between all tape data bit channels. Indicator lamps a–g, and i–p indicate by varying degrees of skew delay from the delay of the master channel, which is represented by indicator lamps 160h–174h. For example, if indicator lamp 160a, 162c, 164d, 166g, 167, 168j, 170k, 172l and 174n were illuminated, the skew indicator 30 would indicate the relative dynamic skew delay condition between channels 1–4 and 6–9, as compared with master channel 5, and represented by indicator lamp rows 160–174, and lamp 167. With indicator 167 indicating a predetermined skew delay, channels 2–4 exhibit greater degrees of skew delay relative to the master channel 5, while channels 6–8 show greater degrees of skew delay with channel 9 exhibiting a maximum skew delay relative to the master channel represented by lamp 167. As the relative skew delay between the parallel data channels and the master channel increases or decreases, various indicator lamps a–p will be lighted for each of the indicator rows 160–174, thus giving a constant visual dynamic indication of the relative skew delay of the parallel data transmission channels.

Figure 10:
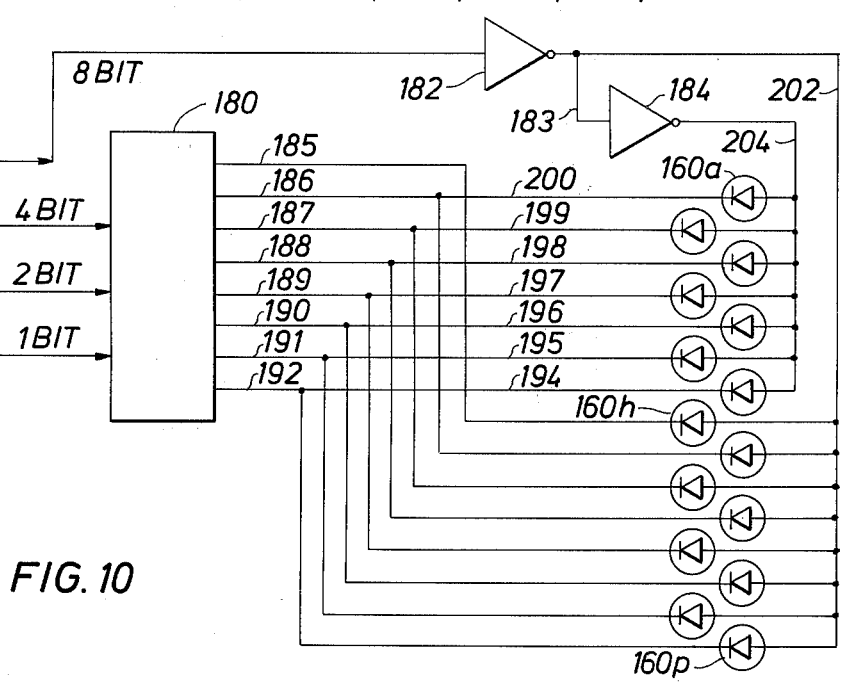
FIG. 10 is a schematic diagram of the circuitry associated with one channel of the dynamic skew indicator.

FIG. 10 is a schematic of a row of indicator lamps 160a–p and their associated circuitry. The 1 bit, 2 bit, 4 bit and 8 bit signals from the delay counter of slave channel 1 of the skew compensator 25 are applied through lines 175–178, with the 1 bit, 2 bit and 4bit signals being applied as inputs to circuit 180, a digital to decimal converter. The 8 bit signal is applied through line 175 to an inverter 182, the output of which is applied through line 202 as inputs to LED indicators 160h–p. The output of inverter 182 is applied through line 204 as inputs to LED indicators 160a–g. The outputs of circuit 180 are applied through lines 185–192 as inputs to LED indicators 160h–p, and lines 186–192 are also applied as inputs to LED indicators 160a–g. As the 1bit, 2 bit, 4 bit and 8bit signals from the delay counter of the slave channel are received, the skew delay, in decimal count, is applied to one of the respective indicator lamps 160a–p to visually indicate the degree of skew delay as compared to the master channel 167.

Numerous variations and modifications may obviously be made in the structure herein described, without departing from the present invention. Accordingly, it should be clearly understood that the forms of the invention herein described and shown in the figures of the accompanying drawings are illustrative only and are not intended to limit the scope of the invention.

What is claimed is:
1. Apparatus for recovery of missing data bits in reading static skew compensated parallel data tracks having at least two channels for parallel transmission of data bits, comprising the combination of
   first storage means for receiving said data bits from each of said channels and storing said received data bits therein, said first storage means responsive to a first periodic strobe signal for clearing said received data bits from said first storage means,
   second storage means responsive to a second periodic strobe signal for causing said second storage means to receive said data bits from the output of said first storage means, said second storage means responsive to a third periodic strobe signal for clearing said received data bits therefrom,
   means for detecting the absence of a necessary data bit in one of said parallel data bit channels at the ouput of said first storage means and generating a simulated data bit in response thereto, said generated data bit being applied as an input to said second storage means,
   switch means for receiving said simulated data bit from the output of said second storage means and selectively applying said simulated data bit to a known parallel data bit channel missing said necessary data bit, and
   clock generator means for generating said first, second and third periodic strobe signals, the periodic occurrence of which may be varied in functional relation to the average time interval between successive data characters in said parallel transmission channels.

2. The apparatus as described in claim 1, wherein said clock generator means comprises the combination of
   detecting means for detecting the occurrence of each of said data bits and generating an output pulse in response thereto,
   means responsive to said detecting means' output pulses for generating a plurality of first output signals in response to the receipt of the first data bit of a new data character,
   means reponsive to said plurality of first output signals for generating a plurality of second output signals defining a variable periodic interval following the occurrence of said first data bit of a new data character detected,
   means responsive to said plurality of second output signals for generating a plurality of periodic strobe signals, the periodic occurrence of which is functionally related to the periodic interval of said plurality of second output signals, and
   control means responsive to said detecting means' output pulses and selected ones of said plurality of first and second output signals for controlling the periodic interval of said plurality of second output signals.

3. The apparatus as defined in claim 2, wherein said control means further comprises
   means for detecting the time relationship between selected ones of said first and second output signals generated in response to the occurrence of said first parallel data bit from one of the channels and generating a control signal in response thereto, and
   means for receiving successive ones of said control signals and averaging a predetermined number of said control signals for controlling the periodic interval of said plurality of second output signals.

4. The apparatus as defined in claim 1, wherein said means for detecting the absence of a necessary data bit comprises means for comparing the parity of said parallel data bit channels and generating a simulated data bit in response to detecting even parity.

5. The apparatus as defined in claim 1, wherein said static skew compensated parallel data tracks are created by a static skew compensation circuit having a master channel and one or more slave channels, and further comprising a dynamic visual indicator of the static skew delay of each slave channel relative to the delay of the master channel of said associated static skew compensation circuit.

6. Apparatus for recovering missing data bits in the parallel transmission of data having at least two channels for parallel transmission of data bits, comprising
   first storage means for receiving said data bits from each of said channels and storing said received data bits therein, said first storage means responsive to a periodic strobe signal for clearing said received data bits from said first storage means,
   second storage means for receiving said data bits from said first storage means and responsive to said periodic strobe signal for clearing said received data bits therefrom,
   means for detecting at the output of said first storage means the absence of a necessary bit in one of said parallel data bit channels for forming a data character and generating a simulated data bit in response thereto, third storage means for receiving said simulated data bit and responsive to said periodic strobe signal for clearing said simulated data bit therefrom, switch means for receiving said simulated data bit from the output of said third storage means and selectively applying said simulated data bit to a known parallel data bit channel missing said necessary data bit, and clock track means for generating said periodic strobe signal, the periodic occurrence of which is functionally related to the average time interval between successive data characters.

7. The apparatus as defined in claim 6, wherein said clock track means comprises the combination of detecting means for detecting the occurrence of each of said data bits and generating an output pulse in response thereto, means responsive to said detecting means' output pulses for generating a plurality of first output signals in response to the receipt of the first data bit of a new data character, means responsive to said plurality of first output signals for generating a plurality of second output signals defining a variable periodic interval following the occurrence of said first data bit of a new data character, means responsive to said plurality of second output signals for generating a periodic strobe signal, the periodic occurrence of which is functionally related to the periodic interval of said plurality of second output signals, and control means responsive to said detecting means' output pulses and selected ones of said plurality of first and second output signals for controlling the periodic interval of said plurality of second output signals.

8. The apparatus as defined in claim 7, wherein said control means further includes means for detecting the occurrence of said detecting means' output pulses and selected ones of said first and second output signals generated in response to the occurrence of said first parallel data bit of a new data character and generating a control signal in response thereto, and means for receiving successive ones of said control signals and averaging a predetermined number of said control signals for controlling the periodic interval of said plurality of second output signals.

9. Apparatus for recovering missing data bits in a parallel data transmission system having at least two channels for static skew compensated parallel transmission of data bits, comprising the combination of first storage means for receiving said data bits from each of said channels and storing said received data bits therein, said first storage means reponsive to a first periodic strobe signal for clearing said received data bits from said first storage means, second storage means responsive to a second periodic strobe signal for receiving said data bits from the output of said first storage means, said second storage means responsive to a third strobe signal for clearing said received data bits therefrom, means for detecting at the output of said first storage means the absence of a necessary bit for forming a data character in one of said parallel data bit channels and generating a simulated data bit in response thereto, said generated data bit applied as an input to said second storage means, switch means for receiving said simulated data bit from the output of said second storage means and selectively applying said simulated data bit to a known parallel data bit channel missing said data bit, detecting means for detecting the occurrence of each of said data bits and generating an output pulse in response thereto, means responsive to said detecting means' output pulses for generating a plurality of first output signals in response to the receipt of the first data bit of a new data character, means reponsive to said plurality of first output signals for generating a plurality of second output signals defining a periodic interval following the occurrence of said first data bit of a new character, means responsive to said plurality of second output signals for generating said first, second and third periodic strobe signals, the periodic occurrence of each of which is functionally related to the periodic interval of said plurality of second output signals, and control means responsive to said detecting means' output pulses and selected ones of said plurality of first and second output signals for controlling the periodic interval of said plurality of second output signals.

10. The apparatus as defined in claim 9, wherein said control means further comprises means for detecting the occurrence of said detecting means' output pulses and selected ones of said first and second output signals generated in response to the occurrence of said first data bit in a new data character and generating a control signal in response thereto, and means for receiving successive ones of said control signals and averaging a predetermined number of said control signals for controlling the periodic interval of said plurality of second output signals.

11. The apparatus as defined in claim 9, wherein said means for detecting the absence of a necessary data bit comprises means for comparing the parity of said parallel data bit channels and generating a simulated data bit in reponse to detecting even parity.

12. The apparatus as defined in claim 9, wherein said static skew compensated parallel data tracks are created by a static skew compensation circuit having a master channel and one or more slave channels, and further comprising dynamic indicator means for visually indicating the static skew delay of each slave channel relative to the master channel of said associated static skew compensation circuit.

13. Apparatus for recovery of missing information bits in static skew compensated magnetic recorded parallel data tracks having at least two channels for parallel transmission of data bits, comprising the combination of first storage means for receiving said data bits from each of said channels and storing said received data bits therein, said first storage means responsive to a periodic strobe signal for clearing said received data bits from said first storage means, second storage means for receiving said data bits from the output of said first storage means, said second storage means also responsive to a periodic strobe signal for clearing said received data bits therefrom, means for detecting at the output of said first storage means the absence of a necessary information bit in one of said parallel channels and generating a simulated information bit in response thereto, said generated information bit applied as an input to said second storage means, switch means for receiving said simulated information bit from the output of said second storage means and selectively applying said simulated information bit to a known parallel channel missing said bit, and clock means for generating said periodic strobe signals, the periodic occurrence of which may be varied in functional relation to the average time interval between selected successive magnetic flux changes on the recording channels.

14. The apparatus defined in claim 13, wherein said clock means further comprises means responsive to said selected successive magnetic flux changes for generating a plurality of output signals, selected ones of said signals defining a periodic interval following the occurrence of said selected magnetic flux changes, means responsive to said plurality of second output signals for generating periodic strobe signals, the periodic occurrence of each of which is functionally related to the periodic interval of said plurality of second output signals, and control means cooperating with said means responsive to said selected successive magnetic flux changes and selected ones of said plurality of output signals for controlling the periodic interval of said plurality of output signals.

15. The apparatus as defined in claim 14, wherein said means for generating periodic strobe pulses generates one periodic strobe signal which simultaneously clears said first and second storage means.

16. The apparatus as defined in claim 14, wherein said means for generating periodic strobe pulses generates a plurality of strobe signals, a first strobe signal clearing said first storage means, a second strobe signal enabling said second storage means to receive said data bits from said first storage means, and a third strobe signal clearing said second storage means.

17. The apparatus defined in claim 14, wherein said control means further comprises means for detecting the occurrence of said magnetic flux changes and selected ones of said output signals and generating a control signal in response thereto, and means for receiving successive ones of said control signals and averaging a predetermined number of said control signals for controlling the periodic interval of said selected ones of said plurality of output signals.

18. The apparatus as defined in claim 13, wherein said means for detecting the absence of a necessary information bit comprises means for comparing the parity of said parallel data bit channels and generating a simulated data bit in response to detecting even parity.

19. The apparatus as defined in claim 13, wherein said means for detecting the absence of a necessary information bit comprises means for detecting parity errors in a parity track of said parallel transmission channels and generating a correct parity bit in response thereto.

20. The apparatus as defined in claim 17, wherein said selected successive magnetic flux changes on the recording channels are successive data characters in said parallel transmission channels.

21. The apparatus as defined in claim 17, wherein said selected successive magnetic flux changes on the recording channels are successive clock signals on a separate clock track in said parallel transmission channels.

22. The apparatus as defined in claim 13, wherein said static skew compensated parallel data tracks are created by a static skew compensation circuit having a master channel and one or more slave channels, and furher comprising dynamic indicator means for visually indicating the static skew delay of each slave channel relative to the master channel of said associated static skew compensation circuit.

* * * * *

UNITED STATES PATENT OFFICE
CERTIFICATE OF CORRECTION

Patent No. 4,024,498          Dated May 17, 1977

Inventor(s) Billy L. McIntosh

It is certified that error appears in the above-identified patent and that said Letters Patent are hereby corrected as shown below:

In the specification:

Col. 2, line 16, change "of" to --on--;

Col. 2, line 42, change "storage" to --strobe--;

Col. 4, line 46, delete the period after "42";

Col. 4, line 52, change "frist" to --first--;

Col. 5, line 42, change "gnerated" to --generated--;

Col. 8, line 52, change "seven control" to --seven (7) control--;

Col. 10, line 27, change "cata" to --data--;

Col. 13, line 43, change "342" to --34a--.

*Signed and Sealed this*

*Twenty-second* Day of *November 1977*

[SEAL]

Attest:

RUTH C. MASON
*Attesting Officer*

LUTRELLE F. PARKER
*Acting Commissioner of Patents and Trademarks*